US006955306B2

(12) United States Patent
Salvador et al.

(10) Patent No.: US 6,955,306 B2
(45) Date of Patent: Oct. 18, 2005

(54) PIVOTALLY ADJUSTABLE NOZZLE ASSEMBLY

(75) Inventors: Christopher Salvador, Raymond, OH (US); Douglas Kaltenmark, Raymond, OH (US); Kris Lemmon, Raymond, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 101 days.

(21) Appl. No.: 10/384,377

(22) Filed: Mar. 7, 2003

(65) Prior Publication Data

US 2004/0195366 A1 Oct. 7, 2004

(51) Int. Cl.[7] .................................................. B05B 1/10

(52) U.S. Cl. ................ 239/284.1; 239/263; 239/225.1; 239/589; 15/250.13

(58) Field of Search .......................... 239/284.1, 284.2, 239/589, 589.1, 225.1, 513, 263, 265; 15/250.13, 15/250.201; 422/124

(56) References Cited

U.S. PATENT DOCUMENTS

| | | | | |
|---|---|---|---|---|
| 2,988,287 | A * | 6/1961 | Sherman | 239/726 |
| 3,782,637 | A * | 1/1974 | Crumpacker | 239/232 |
| 4,204,643 | A * | 5/1980 | Cornelius | 239/741 |
| 5,820,026 | A * | 10/1998 | Raghu | 239/284.1 |

* cited by examiner

*Primary Examiner*—Dinh Q. Nguyen
(74) *Attorney, Agent, or Firm*—Carrier, Blackman & Associates, P.C.; William D. Blackman; Joseph P. Carrier

(57) ABSTRACT

A fluid-dispensing nozzle assembly automatically pivotally adjusts within a defined range of motion, to consistently project a fluid toward a windshield for contact at a designated area thereof, regardless of the velocity of ambient air therepast. The nozzle assembly adjusts automatically without requiring electric motors or other energy input. The pivotally adjustable fluid-dispensing nozzle assembly includes a support member and a nozzle member which is pivotally attached to the support member. The nozzle member is provided with an air engaging surface, to enable air moving therepast to pivotally move the nozzle member, once the passing air achieves a predetermined flow rate.

19 Claims, 5 Drawing Sheets

PIVOTALLY ADJUSTABLE NOZZLE ASSEMBLY

FIELD OF THE INVENTION

The present invention relates to a nozzle assembly for dispensing a fluid onto a substrate. More particularly, the present invention relates to a pivotally adjustable nozzle assembly for consistently dispensing windshield washer fluid on to a designated portion of a vehicle windshield. Even more particularly, the present invention relates to a nozzle assembly of the described type, which is constructed and arranged to be automatically angularly adjustable within a defined range of motion, relative to the velocity of passing ambient air.

BACKGROUND OF THE INVENTION

Within the automotive field, fixed-orifice nozzles are commonly used to dispense windshield washer solvent on to a vehicle's windshield. It has been known to attach a nozzle assembly to the vehicle in a fixed manner in front of the vehicle's windshield, typically on the hood or engine cowl, and to orient the nozzle at a fixed angle to direct washer solvent to a predetermined contact area on the windshield. Some of the known nozzle assemblies may be manually pivotally adjusted while the vehicle is parked, or is otherwise sitting still. Examples of some of the known designs for manually adjustable windshield washer nozzles are given in U.S. Pat. Nos. 2,898,036, 3,067,955, and 5,975,431.

When a vehicle is stationary or is traveling at a relatively low speed, a conventional nozzle assembly will generally permit the nozzle to direct washer solvent to the correct predetermined location on the windshield.

However, as the vehicle speed increases, there is a tendency for air to displace the washer fluid stream after it leaves the nozzle, so that the stream may not contact the preferred location on the windshield, but may be displaced to a lower, less beneficial location. At freeway speeds, it becomes difficult or virtually impossible to apply windshield washer fluid using the conventional system, because more often than not, the fluid spray will be redirected by passing air, and will fail to reach a useful area of the windshield. Most experienced drivers are familiar with this situation.

In response to this problem, some attempts have been made to compensate for the displacement of windshield washer solvent from a nozzle assembly at higher speeds.

Some examples of known devices that depict devices addressing this problem are illustrated in U.S. Pat. Nos. 3,403,859; 4,618,096; 5,820,026; 5,965,950; and, 6,082,636, which are discussed further below.

Daansen, U.S. Pat. No. 3,403,859, entitled, "Venturi Washer," discloses a washer system for dispensing fluid onto a predetermined area of a vehicle's windshield. The Daansen invention encloses a washer fluid nozzle within a venturi for dispensing washing fluid. The venturi is a funnel-like scoop on the vehicle hood that surrounds the nozzle. The venturi is designed to generate a protective channel of air when the vehicle is moving, to move with fluid expelled from the washer nozzle, and to facilitate contact of washer fluid on the vehicle's windshield at a predetermined area, regardless of the vehicle's speed.

Kondo et al., U.S. Pat. No. 4,168,096, entitled, "Window Washer for Vehicle," discloses a windshield washer system for washing the windshield of a vehicle, which periodically alters the pressure at which the washer fluid is expelled from the spray nozzle. The Kondo et al. invention incorporates a pressurized means in combination with a fluidic oscillator to periodically increase the pressure at which washer fluid exits the washer spray nozzle, in an attempt to counter wind shear experienced when a vehicle is traveling at high speeds.

Raghu, U.S. Pat. No. 5,820,026, entitled, "High-Speed Windshield Washer Nozzle System," discloses a device which elevates the washer fluid as it travels toward the windshield when a vehicle is traveling at high speeds. The Raghu invention incorporates a concave incline or tab along the top of the nozzle housing to create a vortex between the nozzle and the windshield, which elevates washer fluid after exiting the spray nozzle when the vehicle is traveling at high speeds.

Park, U.S. Pat. No. 5,965,950, entitled, "Device For Controlling The Injection Location Of Washer Solution," discloses a washer system for dispensing washer fluid to a predetermined location on the windshield of a vehicle traveling at any rate of speed. The Park invention uses an electronic control unit to vary the pressure at which the system dispenses washer fluid, in connection with the rate at which the vehicle is traveling.

Yoshida et al., U.S. Pat. No. 6,082,636, entitled, "Window Washer Nozzle Assembly Having A Favorable Spray Pattern," discloses a washer nozzle assembly for a vehicle, which dispenses washer liquid at all speed ranges. The Yoshida et al. invention utilizes a nozzle with an upper and lower lip, the upper lip extending further outward than the lower, wherein the upper lip facilitates placement of washer liquid on a predetermined location when the vehicle is traveling at high speeds.

While each of the aforementioned patents provides an apparatus for dispensing washer fluid toward a predetermined location of a vehicle's windshield, a need still exists in the art for an improved fluid-dispensing nozzle assembly.

Ideally, a fluid-dispensing nozzle apparatus would automatically adjust during vehicle operation to change the angle at which the fluid spray is directed, so as to compensate for a change in the surrounding air velocity. Such an adjustable nozzle would provide more consistent placement of washer fluid on the windshield of a vehicle than is available with conventional nozzles.

SUMMARY OF THE INVENTION

The present invention has been developed to overcome limitations and disadvantages of the prior art, and to fulfill a need in the art for an improved fluid-dispensing nozzle assembly.

A nozzle assembly, in accordance with the present invention, automatically pivotally adjusts within a defined range of motion, to consistently project a fluid toward a windshield for contact at a designated area thereof, regardless of the velocity of the ambient air. The nozzle assembly hereof is preferred to be passively self-adjusting, that is, to adjust automatically without requiring electric motors or other energy input.

A pivotally adjustable fluid-dispensing nozzle assembly, in accordance with the present invention, includes a support member and a nozzle member which is pivotally attached to the support member. The nozzle member is provided with an air engaging surface, to enable air moving therepast to pivotally move the nozzle member, once the passing air achieves a predetermined flow rate.

Accordingly, it is an object of the present invention to provide a nozzle member for use with a fluid supply system in dispensing fluid onto the windshield of a vehicle. The nozzle member includes a housing having a hollow passage defined therein, the housing including a projection surface having a nozzle with an outlet formed therein, the outlet being in fluid communication with the passage. The passage serves as a fluid connection through which a fluid travels prior to leaving the housing via the nozzle. The nozzle dispenses washer fluid outwardly in a fluid stream, which is directed towards a predetermined area of the windshield.

It is another object of the invention to provide a nozzle assembly which is passively pivotally adjustable during vehicle operation.

It is still another object of the invention to provide a nozzle apparatus including a nozzle member pivotally attached to a support member. The pivotal relationship between the nozzle member and the support member permits the nozzle member to pivotally adjust the angle at which fluid is distributed from the projection surface to the substrate. Direct pivotal contact occurs through the operative engagement between the support arm or arms of the support member and the housing of the nozzle member.

It is still another object of the invention to provide a nozzle member with a nozzle thereon, the nozzle member also including a wind-engaging surface for contacting passing air to allow for pivotal elevation thereof.

Other objects, advantages and salient features of the invention will become apparent from the following detailed description which, in conjunction with the annexed drawings, disclose the presently preferred embodiments of the invention.

DETAILED DESCRIPTION

The present invention, in its broadest sense, includes a support member and a nozzle member pivotally attached to the support member, in which the nozzle member is passively pivotally movable by air moving therepast.

Figure 1:
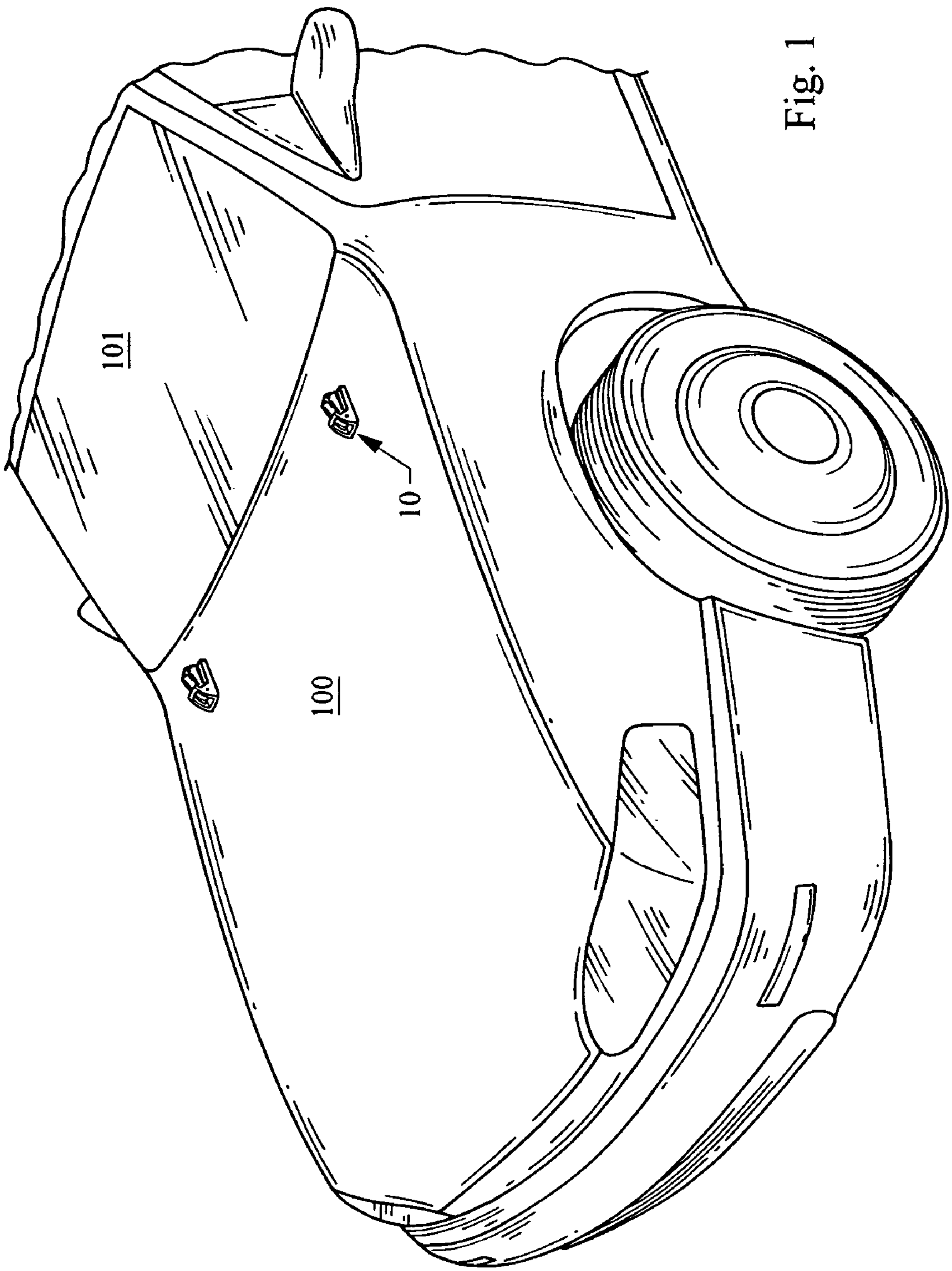
FIG. 1 is an environmental perspective view of a vehicle front end, showing a fluid-dispensing apparatus thereon according to a first embodiment of the invention.
Figure 2A:
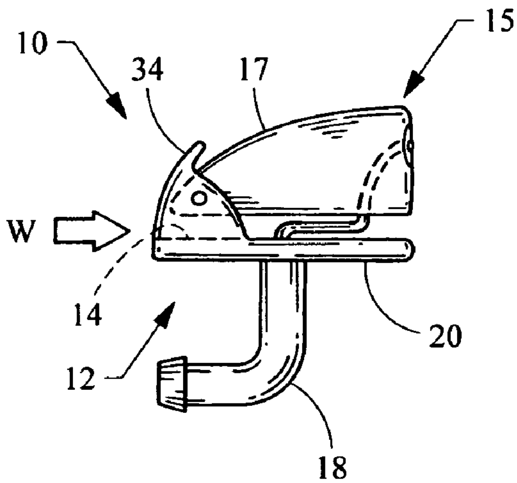
FIG. 2A is a side plan view of the fluid-dispensing apparatus of FIG. 1, with a nozzle member shown in a resting position thereof.
Figure 2B:
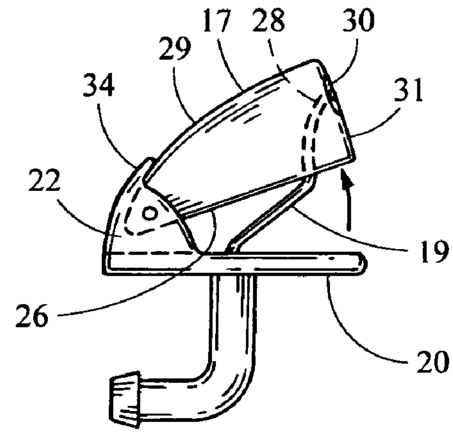
FIG. 2B is a side plan view of the fluid-dispensing apparatus of FIG. 1, with the nozzle member shown in an elevated position thereof.
Figure 2C:
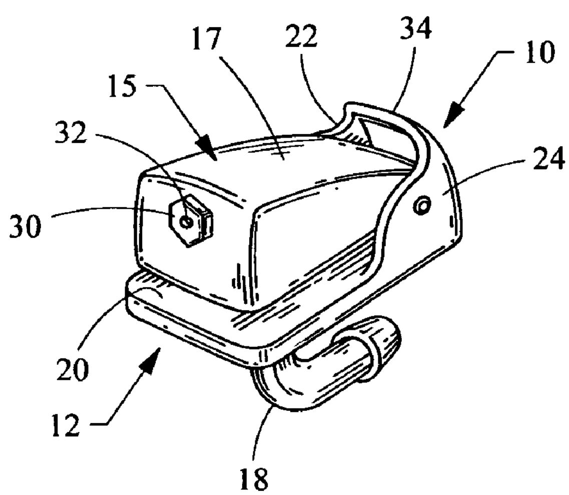
FIG. 2C is a perspective view of the fluid-dispensing apparatus of FIGS. 1–2B.
Figure 2D:
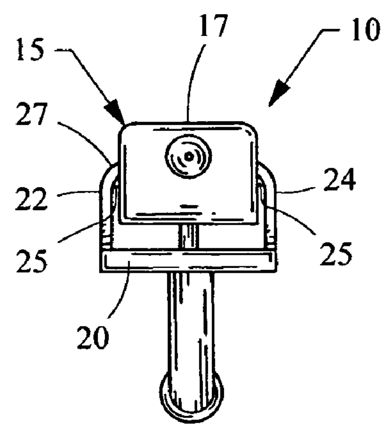
FIG. 2D is a rear plan view of the fluid-dispensing apparatus of FIGS. 1–2C.

Referring to FIGS. 1–2D of the drawings, a pivotally adjustable fluid-dispensing nozzle apparatus, according to a first illustrative embodiment of the invention, is shown generally at 10, installed on a vehicle 100. It will be understood that during operation thereof, the vehicle 100 moves forwardly through ambient air, which creates the subjective impression of wind passing the vehicle to a vehicle occupant.

Reference will therefore be made herein to effective wind moving past the apparatus 10, which is intended to mean relative subjective air speed, caused by forward movement of the vehicle 100, and as experienced at the apparatus.

Throughout the following description, the terms "front" and "rear" are used with reference to the orientation of the apparatus 10 in an installed position on a vehicle, as shown in FIG. 1. Therefore, the front and rear of the apparatus 10 correspond to the front and rear of the vehicle, and accordingly, it will be understood that the nozzle 30 will be located on a rearward-facing surface of the apparatus 10, so as to be oriented facing toward the vehicle windshield 101.

The fluid-dispensing apparatus 10 is provided for dispensing windshield washer fluid outwardly therefrom, in a fluid stream, towards a vehicle's windshield 101. The apparatus 10 generally includes a support member 12 for affixing to a vehicle 100, and a nozzle member 15 which is pivotally attached to the support member 12.

Specifically referring to FIGS. 1–2D, the support member 12, as shown according to the first embodiment, incorporates a fluid supply conduit 18 for connecting to a source of fluid, a base 20 for attaching to a vehicle surface, and a pair of spaced-apart upstanding support arms 22, 24 (FIG. 2C). The support member 12 is constructed of a lightweight, rigid material such as die-cast metal, aluminum, or a strong plastic.

As shown in FIGS. 2A–2C, the fluid supply conduit 18 is a rigid or flexible tube, which is adapted to connect to a vehicle's windshield washer fluid supply assembly (not shown). It will be understood that in an installed configuration thereof, the fluid supply conduit 18 will be situated below the surface of the vehicle 100, and therefore will not be visible to a causal observer.

A fluid transfer conduit 19 is also provided, extending between the base 20 and the nozzle member 15, to supply fluid to the nozzle member. The fluid transfer conduit 19 must be formed from flexible material, such as pressure-resistant tubing, because it is required to flexibly move when the nozzle member 15 moves, as will be further described.

The base 20 may have a hole formed therethrough to allow fluid communication between the supply conduit and the transfer conduit.

Alternatively, the fluid supply conduit 18 and the transfer conduit 19 may be combined into a single piece of tubing.

As still another alternative structure, the fluid transfer conduit may be formed as an internal channel (not shown) incorporated within an area of the support member 12, e.g. within a support arm such as the support arm shown at 22.

The support member 12 also includes the base 20, which is used to secure the apparatus 10 to the body of a vehicle 100. The base 20 operates as the floor of the support member 12, and attaches to the vehicle surface through the use of conventional fasteners such as screws, rivets or nuts and bolts, or by adhesives such as epoxy or other known adhesives.

The support arms 22, 24 are provided to pivotally support the nozzle member 15 thereon. The support arms 22, 24 are substantially parallel spaced-apart members which extend upwardly from the base 20. In the embodiment of FIGS. 1–2D, the support arms 22, 24 are oriented substantially vertically, and are integrally formed with the base 20.

Figure 7:
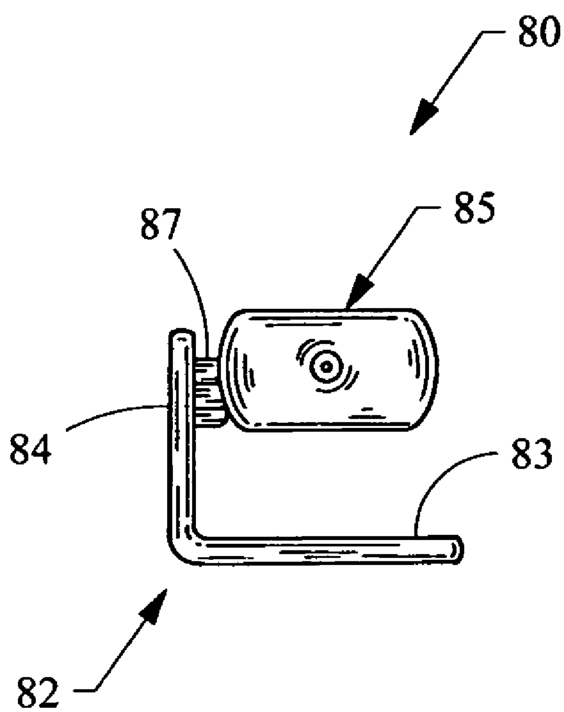
FIG. 7 is a rear plan view of a fluid-dispensing apparatus according to a fifth embodiment of the invention.

As shown in FIG. 7, in an alternative embodiment of a nozzle assembly 80, a modified support member 82 can be made with only a single support arm 84 extending upwardly from the base 83, if desired. In this embodiment, a single pivot arm 87 interconnects the nozzle member 85 to the support member 82.

Optionally, the support member 12 may further incorporate one or more rest stops 25 extending inwardly within the support arms, which are provided to maintain the desired resting orientation of the nozzle member 15. The resting orientation of the nozzle member 15, shown in FIG. 2A, is selected for optimal fluid displacement when the vehicle is at rest or moving slowly, during low velocity or zero movement of ambient air around the vehicle 100.

Alternative embodiments of the apparatus may reduce the number of rest stops to one, or may replace it with a post (not shown), extending upwardly from the base 20. Further alternative embodiments of the support arms may remove the rest stops entirely, and achieve the desired resting angle of the nozzle member by a different method, such as re-shaping a section of the nozzle member to rest on the base 20, or using the fluid transfer conduit 19 to restrict downward movement of the nozzle member.

As seen in FIGS. 2A–2B, the apparatus 10 hereof is preferred to include an upper limit stop member 34 to limit upward pivotal movement of the nozzle 30 with respect to the base. While some upward pivotal movement is important in the practice of the present invention, if the housing 17 pivots upwardly too far, the fluid stream issuing therefrom will be directed too high into the air, and may miss the windshield 101, or may not impact the preferred area thereof. The upper limit stop member 34 may be located in any of a number of positions on the support member 12, on the nozzle member 15, or may include components on both of these.

FIGS. 2A–2B further illustrate the spatial relationship between the support member 12 and the nozzle member 15. The nozzle member 15 is spaced upwardly away from the base 20 of the support member 12, to allow air flow therebetween.

In the embodiment of FIGS. 1–2D, the support member 12 and nozzle member 15 are related in a manner so as to create a duct 14 therebetween, through which air may travel. The duct 14 is the open space bounded by the base 20 at the bottom, the inner surfaces of the support arms 22, 24 on the sides, and the lower surface 26 of the nozzle housing 17. The lower surface of the nozzle housing may also be referred to as the wind-engaging surface 26.

The nozzle member 15 is pivotally attached to the support member 12 by way of any appropriate pivotal connection between the support arms 22, 24 and the housing 17 of the nozzle member 15. Non-limitative examples of suitable connections between the support arms 22, 24 and nozzle member 15 include pins 27 (FIG. 2D), rivets, hollow tubes, a solid axle passing through the nozzle member 15, or other known pivotal mounting hardware. While the drawings show the pins 27 passing through holes formed in the support arms 22, 24, one example of an equivalent structure would be for each of the support arms 22, 24 to have a concave depression or dimple formed in the inward-facing surface thereof, and the ends of the pins 27 could rest in the depressions.

The nozzle member 15 is constructed of material in kind to that of the support member. Preferably, the nozzle member 15 is formed from metal or from a strong plastic. The nozzle member 15 includes a housing 17 having a lower, wind-engaging surface 26 and having a projection surface 31 at the rearward-facing end thereof to support a nozzle 30. The housing 17 has a hollow passage 28 formed therethrough (FIG. 2A), to transmit fluid from the transfer conduit 19 to the nozzle 30.

The nozzle member also includes a nozzle 30, attached to the housing 17 at the projection surface 31, and having an outlet 32 formed therethrough. The nozzle outlet 32 is in fluid communication with the passage 28 of the housing 17. The nozzle 30 may be made removable and replaceable, if desired.

As shown in FIGS. 2A–2B, in the first embodiment of the invention, the housing 17 is designed so that the upper exterior surface 29 and the lower, wind-engaging surface 26 maintain a proportional relationship to each other. Without wishing to be bound by any theory, it is believed that the upper surface 29 provides a longer distance for air to travel over than the lower surface 26, in compliance with Bernoulli's theorem, providing lift to the nozzle member. This phenomenon is believed to be similar to the lift on an airplane's wing.

As the vehicle 100 moves forward through the air, an effective wind W is experienced moving towards the front of the apparatus 10 (corresponding to the front of the vehicle), as shown by the arrow in FIG. 2A. The effective wind W moves through the duct 14, and a low pressure is created at the wind-engaging surface 26 at the bottom of the housing. The effective wind W therefore forces the nozzle member 15 to move pivotally upwardly, into the raised orientation shown in FIG. 2B.

When the nozzle member is in the raised orientation of FIG. 2B, and fluid is fed therethrough, the fluid stream created thereby will be directed at a higher angle, relative to the base 20, than it would be directed in the resting orientation of FIG. 2A. The raised orientation is selected such that even when traveling at highway speed, when fluid is expelled from the nozzle 30, the fluid will make it to an advantageous location on the windshield where it will provide some cleaning ability to the driver, regardless of the vehicle speed.

This is a clear improvement over a single, fixed orientation of the nozzle member 15, even where such single fixed orientation is manually pivotally adjustable when the car is parked. Also, since the movement of the nozzle member is caused automatically by the air passing therepast, it can be described as a passive adjustment which does not require significant energy input.

The projection surface 31, as shown in FIG. 2B, displaces windshield washer fluid via the nozzle 30 onto a desired surface, typically a vehicle's windshield 101. The projection surface 31 is situated on the housing's nozzle member in a manner to provide optimal fluid placement onto the desired surface when the vehicle is at rest or traveling at low speed. The projection surface 31 distributes a fluid in a continuous fluid stream; however, alternative embodiments of the projection surface may spray in an oscillating fashion, or may incorporate multiple projection surfaces at varying angles and directions.

Figure 3:
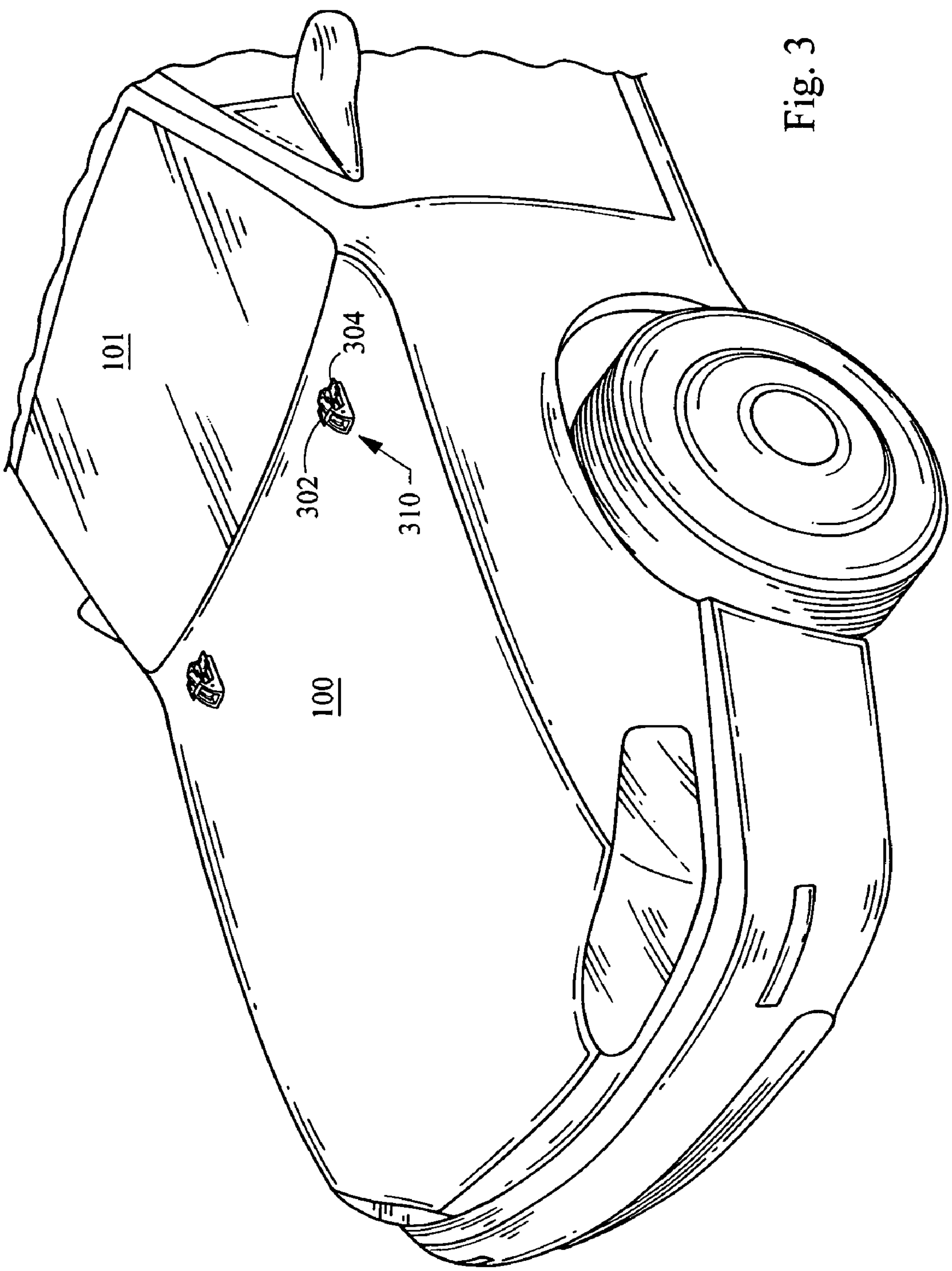
FIG. 3 is a is a perspective view of a vehicle front end, showing a fluid-dispensing apparatus thereon according to a second embodiment of the invention.
Figure 4:
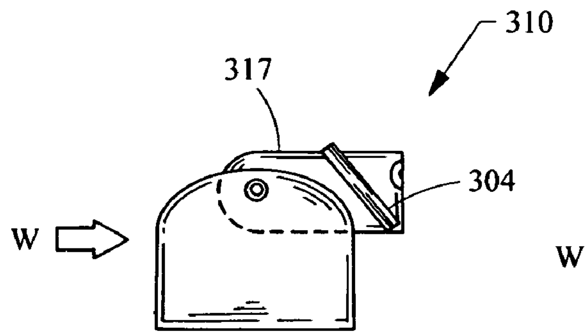
FIG. 4 is a side plan view of the fluid-dispensing apparatus of FIG. 3.

Referring now to FIGS. 3–4, a third embodiment of a fluid-dispensing apparatus is shown at 310, installed on a vehicle 100 in FIG. 3. Fluid conduits and passageways have been eliminated from the drawing of FIG. 4 for illustrative purposes, but such fluid conduits are substantially identical with those described in connection with the apparatus 10 of the first embodiment. The apparatus 310 in this embodiment is substantially identical to the apparatus 10 of the first embodiment as previously described, with the addition of two wing members 302, 304 added to opposite sides of the housing 317, to boost the lifting effect provided by the effective wind W passing thereover.

Figure 5A:
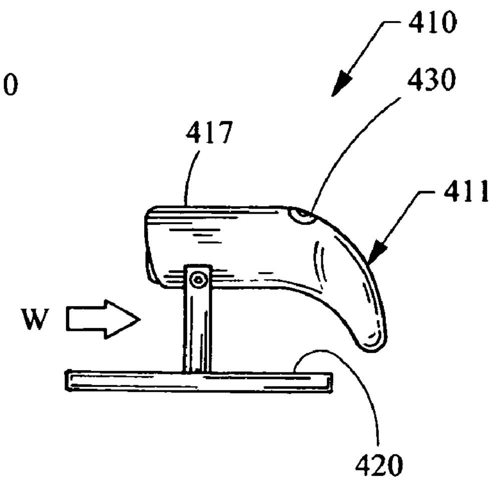
FIG. 5A is a side plan view of a fluid-dispensing apparatus according to a third embodiment of the invention.
Figure 5B:
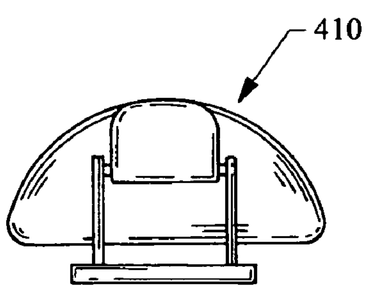
FIG. 5B is a front plan view of the apparatus of FIG. 5A.
Figure 5C:
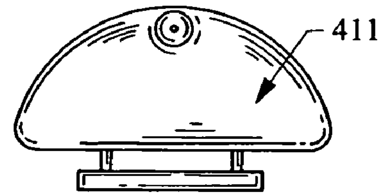
FIG. 5C is a rear plan view of the apparatus of FIG. 5A.

Referring now to FIGS. 5A–5C, a fluid-dispensing apparatus in accordance with a fourth embodiment of the invention is shown generally at 410. The apparatus 410 in this embodiment is substantially identical to the apparatus 10 of the first embodiment as previously described, except as specifically differentiated herein. Fluid conduits and passageways have been eliminated from the drawing of FIGS. 5A–5C for illustrative purposes, but such fluid conduits are substantially identical with those described in connection with the apparatus 10 of the first embodiment.

The apparatus 410 of the fourth embodiment is modified from the apparatus 10 according to the first embodiment, in that the projection surface has been modified and enlarged to form an air dam 411. The air dam 411 is wider than the rest of the housing 417 and is substantially concavely fan-shaped, as shown. The air dam 411 extends downwardly towards the base 420 at the rear of the apparatus 410, and is added to the housing 417 to provide an enlarged surface to provide wind resistance, and thereby contribute to upward pivotal movement of the nozzle 430 when the effective wind W at the apparatus 410 exceeds a predetermined limit.

Figure 6:
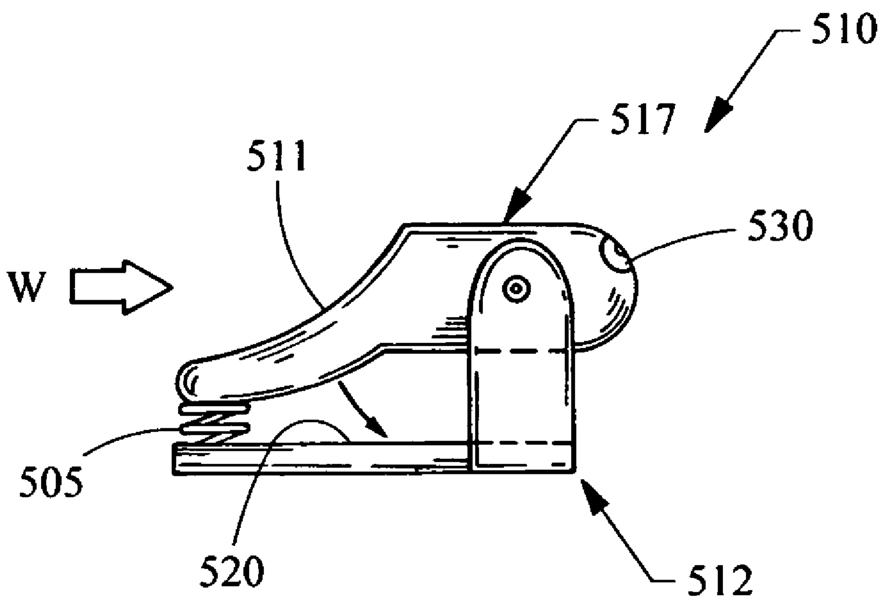
FIG. 6 is a side plan view of a fluid-dispensing apparatus according to a fourth embodiment of the invention.

Referring now to FIG. 6, a fluid-dispensing apparatus in accordance with a fifth embodiment of the invention is shown generally at 510. The apparatus 510 in this embodiment is substantially identical to the apparatus 10 of the first embodiment as previously described, except as specifically differentiated herein. Fluid conduits and passageways have been eliminated from the drawing of FIG. 6 for illustrative purposes, but such fluid conduits are substantially identical with those described in connection with the apparatus 10 of the first embodiment.

The apparatus 510 of the fifth embodiment is modified from the apparatus 10 according to the first embodiment, in that the forward-facing end of the housing 517 has been modified and enlarged to form an air dam 511. The air dam 511 is wider than the rest of the housing 517 and is substantially concavely fan-shaped, as shown. The air dam 511 extends downwardly towards the base 520 at the front of the apparatus 510, and is added to the housing 517 to provide an enlarged surface to provide increased wind resistance, and thereby contribute to the front end of the housing 517 moving downwardly when the effective wind W at the apparatus 510 exceeds a predetermined limit. Downward movement of the air dam 511, at the front of the housing 517, results in upward pivotal movement of the nozzle 530. The apparatus 510 in this embodiment also includes a relatively weak spring 505 located between the tip of the air dam 511 and the base 520, as shown. This spring 505 acts as in a manner similar to the rest stop of the first embodiment, in that it dictates the resting position of the housing 517. When the effective wind W at the apparatus 510 exceeds a predetermined level, the downward force on the air dam 511 exerted by the wind exceeds the force of the spring 505, and the spring is then compressed. The compressed spring 505 and the base 520 cooperate to define an upper limit stop member to limit upward pivotal movement of the nozzle 530.

Although the present invention has been described herein with respect to a preferred embodiment thereof, the foregoing description is intended to be illustrative, and not restrictive. Those skilled in the art will realize that many modifications of the preferred embodiment could be made which would be operable. For instance, the fluid feed conduit 18 and transfer conduit 19 could both be entirely eliminated from the structure of the first embodiment, and a thin-walled tubular metal sleeve could be pressed into the housing channel 28, and used together with a fluid feed tube from a washer fluid supply system (not shown) to feed washer fluid to the apparatus. Many other modifications will occur to those skilled in the art. All such modifications, which are within the scope of the appended claims, are intended to be within the scope and spirit of the present invention.

What is claimed is:

1. A fluid-dispensing apparatus for installation on a vehicle and for dispensing fluid toward the vehicle's windshield, said apparatus comprising:

a support member comprising a base and at least one support arm attached to the base and extending upwardly therefrom;

a nozzle member pivotally attached to the support member, said nozzle member comprising a housing having a hollow passage defined therein, said housing also having an outlet formed therein in fluid communication with the passage;

said nozzle member being provided with an air engaging surface for engaging air moving therepast, and for enabling pivotal movement of the nozzle member when the air achieves a predetermined flow rate.

2. The apparatus of claim 1, further comprising a stop member, attached to the support member or to the nozzle member, for limiting pivotal movement of the nozzle member on the support member.

3. The apparatus of claim 1, wherein the nozzle member is spaced upwardly away from the base of the support member, to allow air how therebetween.

4. The apparatus of claim 1, wherein the nozzle member further comprises an air-diverting structure attached to the housing for interacting with passing air to promote said pivotal movement of said nozzle member.

5. The apparatus of claim 4, wherein the air-diverting structure comprises an air dam extending downwardly from the housing.

6. The apparatus of claim 1, further comprising a spring for biasing the nozzle member into a first orientation thereof.

7. The apparatus of claim 1, wherein said support member comprises two spaced apart support arms extending upwardly from said base.

8. The apparatus of claim 7, wherein the nozzle member is spaced upwardly away from the base of the support member to allow air flow therebetween, and further wherein the support member and the nozzle member cooperate to define a duct therebetween, formed by the lower surface of said housing, the base of said support member, and the support arms of said support member.

9. A method of projecting a fluid from a fluid-dispensing apparatus onto a windshield of a vehicle, comprising the steps of:

a) directing fluid out of a nozzle member in a fluid stream towards said windshield, the nozzle member being oriented in a first position such that the fluid is distributed on said windshield at a predetermined area thereof when ambient air velocity is low;

wherein the nozzle member comprises a housing having a hollow passage defined therein, said housing also having an outlet formed therein in fluid communication with the passage, and wherein the nozzle member is pivotally attached to a support member comprising a base and at least one support arm attached to the base and extending upwardly therefrom, and b) passively moving said nozzle member by engaging air moving therepast with an air engaging surface integrally attached to said housing, to redirect said fluid stream in response to an increase in ambient air velocity.

10. A fluid-dispensing apparatus for installation on a vehicle and for dispensing fluid toward the vehicle's windshield, said apparatus comprising:

a support member comprising a base and at least two support arms attached to the base and extending upwardly therefrom;

a nozzle member pivotally attached to the support member, said nozzle member comprising a housing having a hollow passage defined therein, said housing also having an outlet formed therein in fluid communication with the passage;

said nozzle member being provided with an air engaging surface for engaging air moving therepast, and for enabling pivotal movement of the nozzle member when the air achieves a predetermined flow rate, wherein the nozzle member is spaced upwardly away from the base of the support member to allow air flow therebetween, and further wherein the support member and the nozzle member cooperate to define a duct therebetween, formed by the lower surface of said housing, the base of said support member, and the support arms of said support member.

11. The apparatus of claim 10, further comprising a stop member, attached to the support member or to the nozzle member, for limiting pivotal movement of the nozzle member on the support member.

12. The apparatus of claim 10, wherein the nozzle member further comprises an air-diverting structure attached to the housing for interacting with passing air to promote said pivotal movement of said nozzle member.

13. The apparatus of claim 12, wherein the air-diverting structure comprises an air dam extending downwardly from the housing.

14. A fluid-dispensing apparatus for installation on a vehicle and for dispensing fluid toward the vehicle's windshield, said apparatus comprising:

a support member comprising a base and at least two support arms attached to the base and extending upwardly therefrom;

a nozzle member pivotally attached to the support member, said nozzle member comprising a housing having a hollow passage defined therein, said housing also having a nozzle thereon having an outlet formed therein in fluid communication with the passage; and an air diverting structure operatively attached to the housing and having an air engaging surface for engaging air moving therepast, and for enabling pivotal movement of the nozzle member when the air achieves a predetermined flow rate.

15. The apparatus of claim 14, further comprising a stop member, attached to the support member or to the nozzle member, for limiting pivotal movement of the nozzle member on the support member.

16. The apparatus of claim 15, wherein the air-diverting structure comprises an air dam extending downwardly from the housing.

17. A vehicle, comprising the fluid-dispensing apparatus of claim 1.

18. A vehicle, comprising the fluid-dispensing apparatus of claim 10.

19. A vehicle, comprising the fluid-dispensing apparatus of claim 14.

* * * * *

UNITED STATES PATENT AND TRADEMARK OFFICE

CERTIFICATE OF CORRECTION

PATENT NO. : 6,955,306 B2 
DATED : October 18, 2005
INVENTOR(S) : Christopher Salvador, Douglas Kaltenmark and Kris Lemmon It is certified that error appears in the above-identified patent and that said Letters Patent is hereby corrected as shown below:

Title page,
Item [75], Inventors, change "Christopher Salvador, Raymond, OH (US); Douglas Kaltenmark, Raymond, OH (US); Kris Lemmon, Raymond, OH (US)" to -- Christopher Salvador, Delaware, OH (US); Douglas Kaltenmark, Dublin, OH (US); Kris Lemmon, Dublin, OH (US) --.

Column 3,
Line 45, change "FIG.3 is a is a perspective" to -- FIG.3 is a perspective --.

Column 4,
Line 39, change "visible to a causal observer" to -- visible to a casual observer --.

Column 8,
Line 27, change "to allow air how therebetween" to -- to allow air flow therebetween --.

Signed and Sealed this

Fourth Day of April, 2006

JON W. DUDAS
*Director of the United States Patent and Trademark Office*